Figure 1:
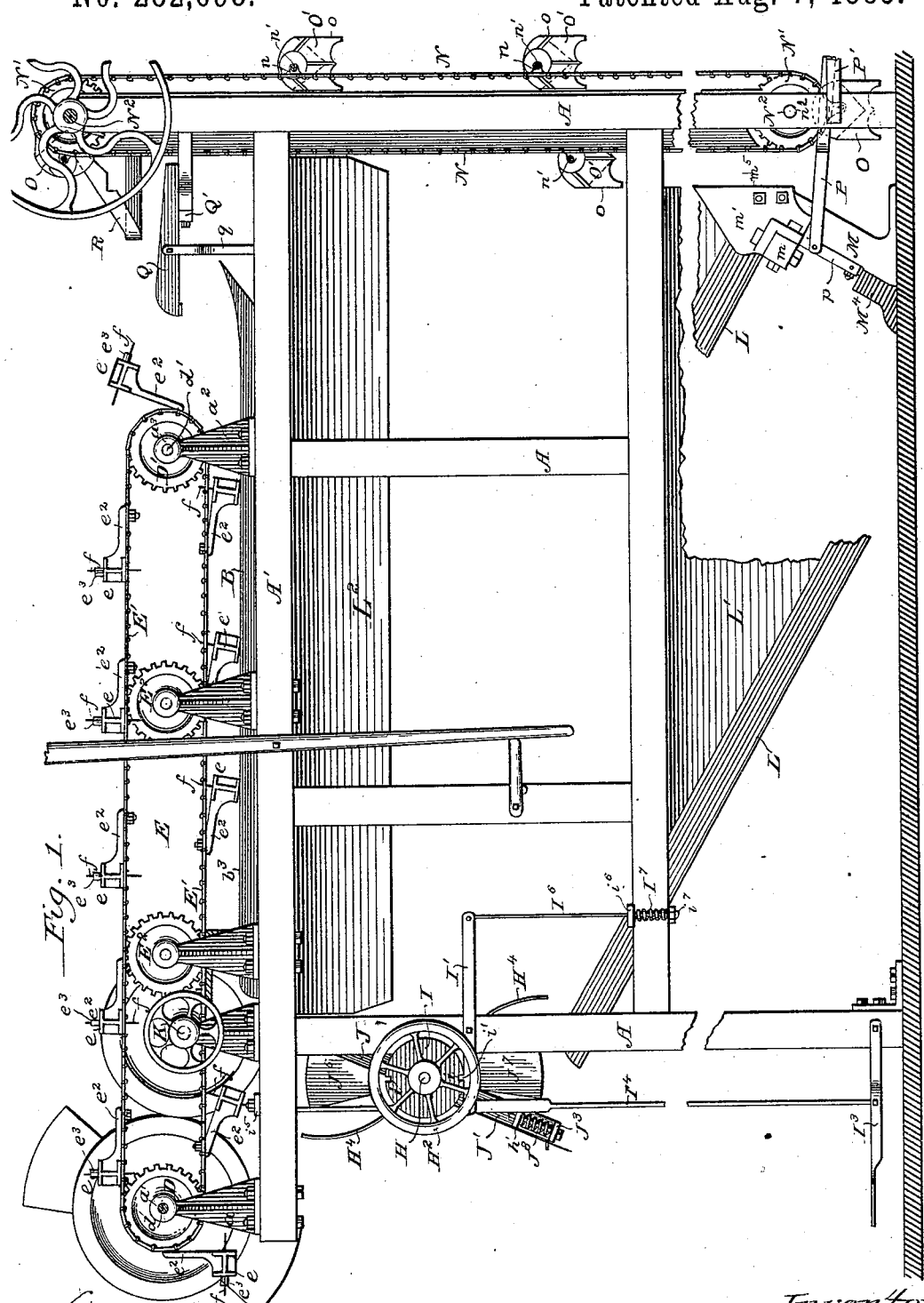

(No Model.) O. P. BRIGGS. 5 Sheets—Sheet 1.
MACHINE FOR STRINGING BARBS ON WIRES.

No. 282,698. Patented Aug. 7, 1883.

Witnesses:
Jno. H. Stockett
C. C. Poole

Inventor:
Orlando P. Briggs
By U. W. Dayton
Attorney.

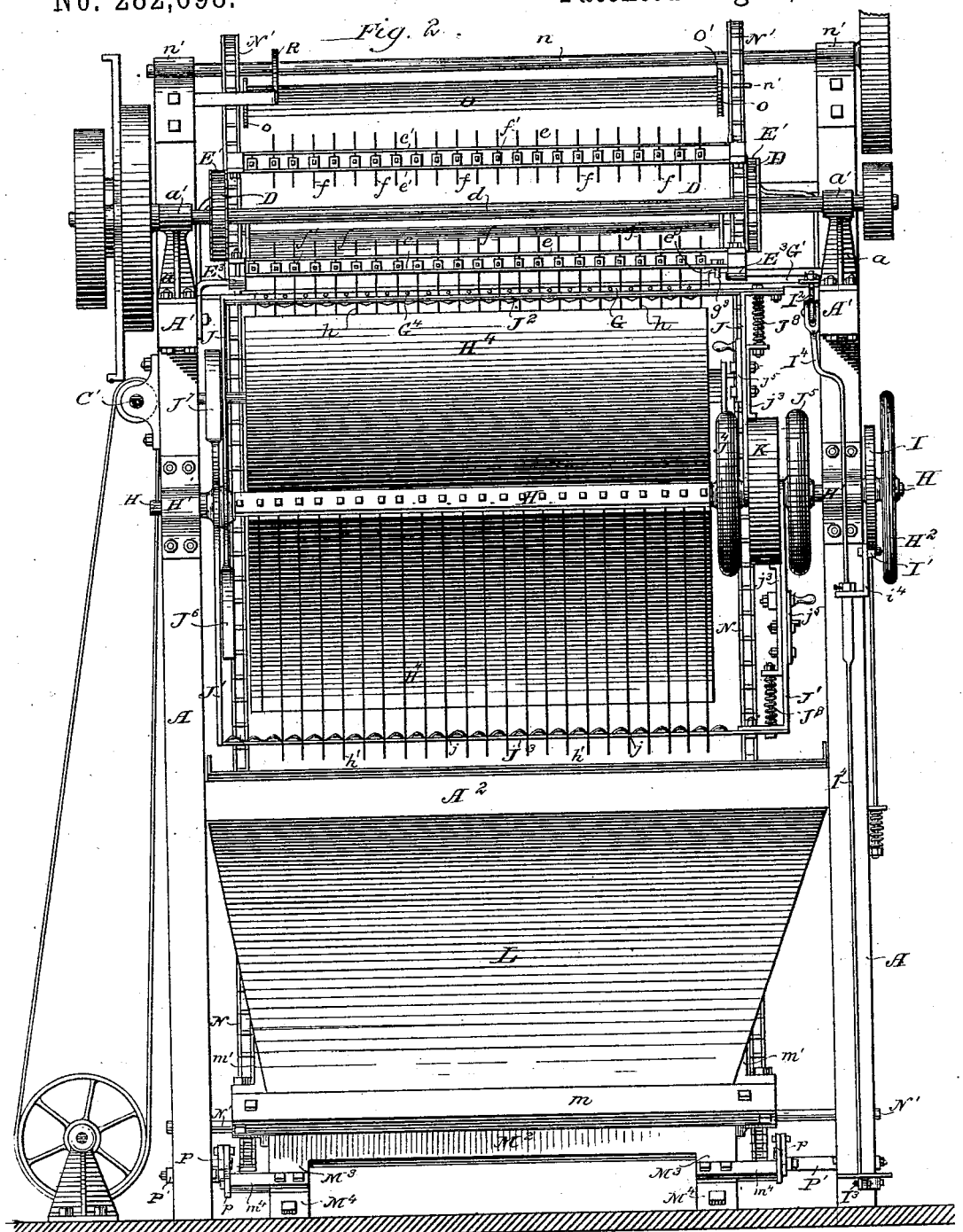

(No Model.) 5 Sheets—Sheet 3.
O. P. BRIGGS.
MACHINE FOR STRINGING BARBS ON WIRES.
No. 282,698. Patented Aug. 7, 1883.
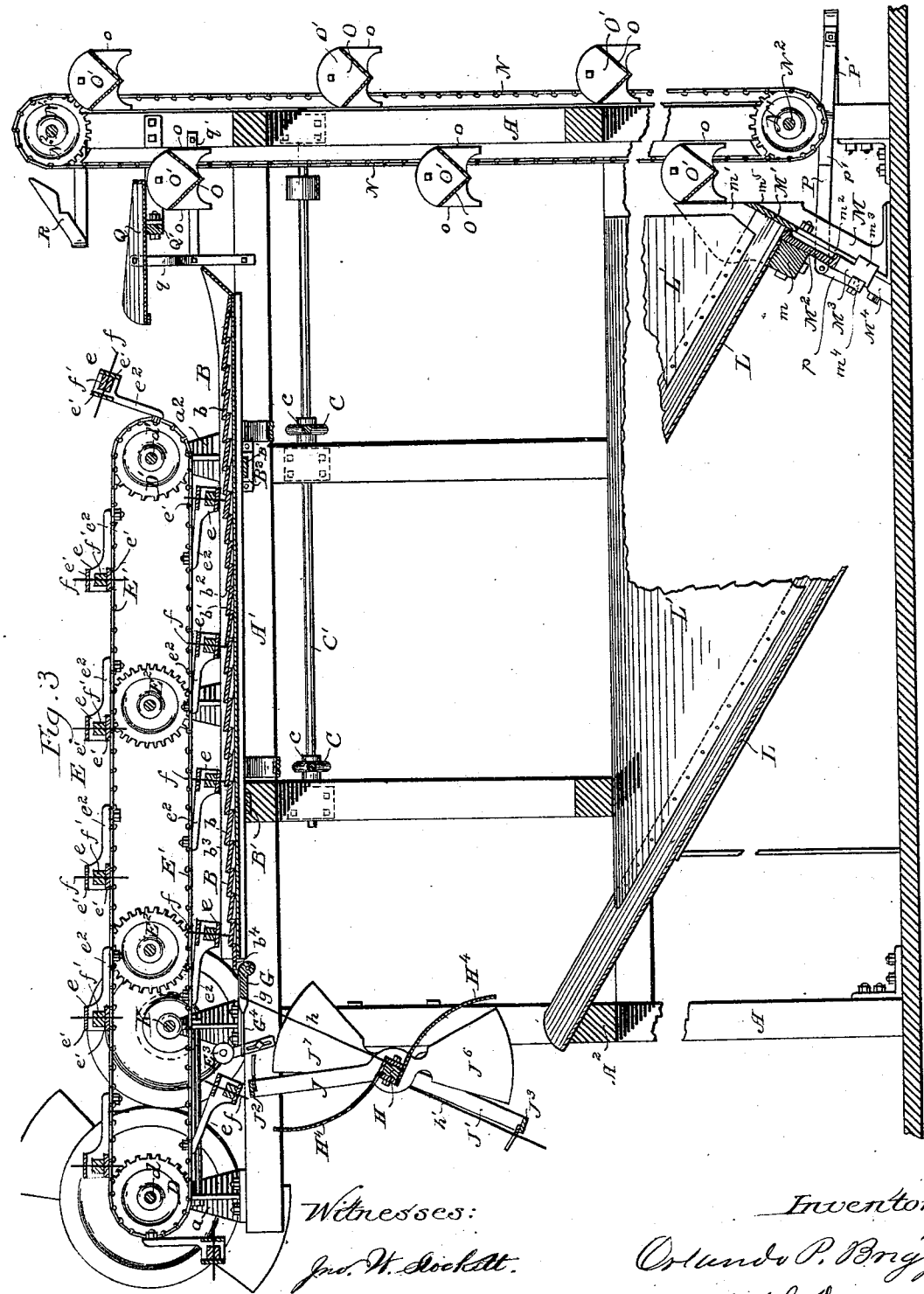
Witnesses:
Jno. W. Dockett.
C. C. Poole
Inventor:
Orlando P. Briggs
By W. S. Dayton
Attorney.

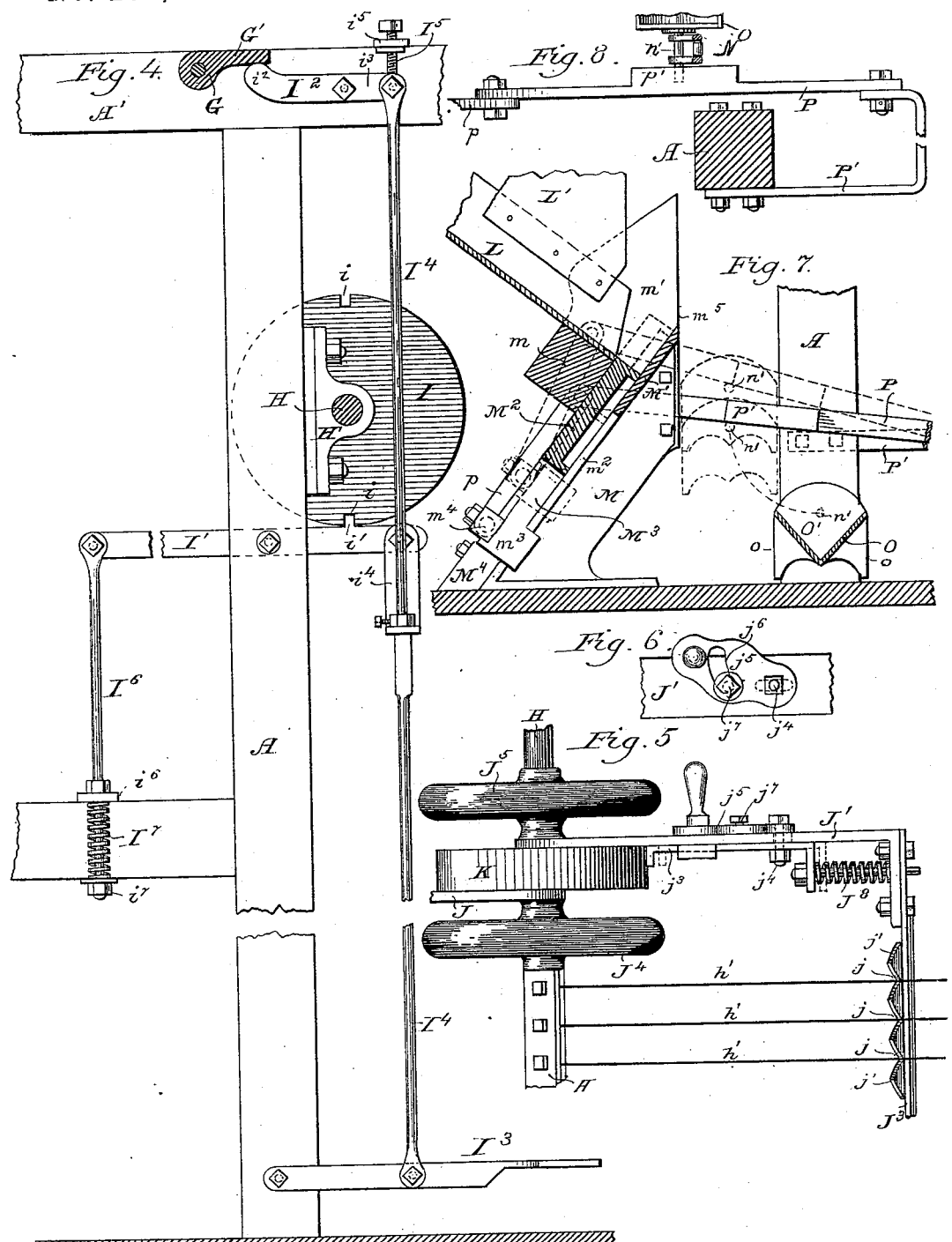

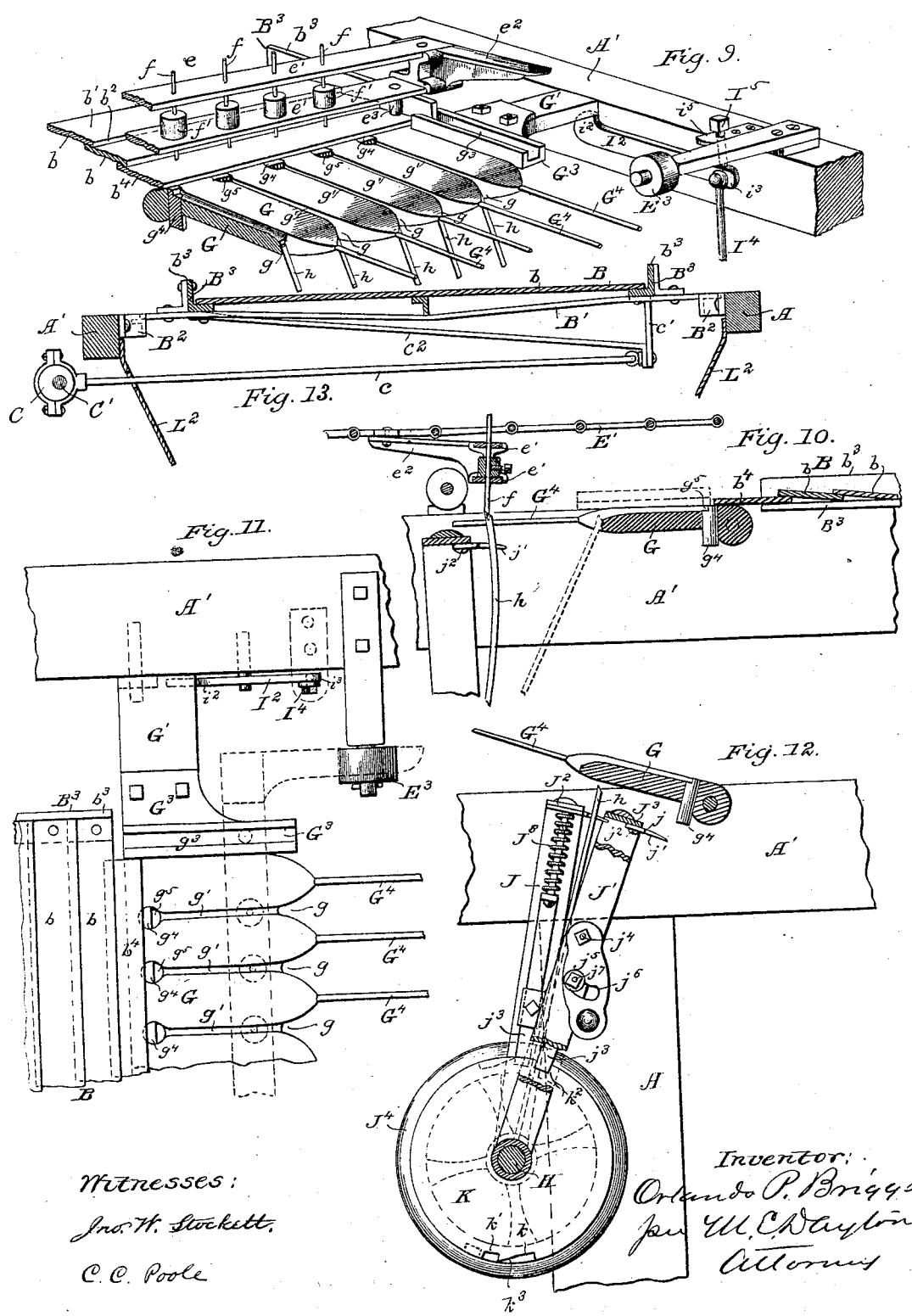

UNITED STATES PATENT OFFICE.

ORLANDO P. BRIGGS, OF CHICAGO, ILLINOIS, ASSIGNOR TO THE THORN WIRE HEDGE COMPANY, OF SAME PLACE.

MACHINE FOR STRINGING BARBS ON WIRES.

SPECIFICATION forming part of Letters Patent No. 282,698, dated August 7, 1883.

Application filed June 22, 1883. (No model.)

*To all whom it may concern:*

Be it known that I, ORLANDO P. BRIGGS, of Chicago, in the county of Cook and State of Illinois, have invented certain new and useful Improvements in Machines for Stringing Barbs; and I do hereby declare that the following is a full, clear, and exact description thereof, reference being had to the accompanying drawings, and to the letters of reference marked thereon, which form a part of this specification.

This invention relates to the manufacture of that class of barbed wires in which the barbs are centrally apertured and are strung upon the fence-wire by being passed over its end, and thereafter distributed and secured at proper intervals.

It relates more particularly to improvements in a machine for stringing the barbs upon short wires or needles preliminary to their transfer to the fence-wires, for which an application for Letters Patent of the United States was made by Seth Turner and George B. Durkee, and allowed on the 15th day of February, 1883; and it consists in the matters hereinafter described, and pointed out in the claims. The barbs which are strung upon the fence-wire by the machine above referred to are generally flat diamond-shaped pieces of metal, having each a central aperture, and the essential features and mode of operation of such machine are as follows: The barbs are first thrown indiscriminately upon a vibrating table located at the top of the machine, which table has a transversely ridged or serrated surface. Over this table is arranged a broad carrier consisting of two chain belts which pass over sprocket-wheels at either end of the machine, and cross-bars or travelers arranged at equal intervals on the belts and extending the full width of the table. These travelers move over the surface of the table a short distance above it in a direction transverse to the ridges or serrations upon its surface and to the direction of its vibration, and also in a direction from the rear toward the front or delivery end of the machine. Attached to the travelers are a series of downwardly-projecting and vertically-movable wires or fingers, the points of which rest upon and are dragged over the serrations on the table as the travelers move forward over the surface thereof. These fingers are weighted, so as to cause the points thereof to follow the serrations upon the surface of the table. The serrated surface of the table is composed of a succession of inclines which rise toward the forward end of the machine, and are alternated with short vertical faces, so that the ends of the weighted fingers, in passing over the table from rear to front, will rise on each incline and then drop over the vertical face to the bottoms of the next incline, and so on until the end of the table is reached. The transverse vibratory motion given to the table serves to distribute the loose barbs in the depressions between the ridges thereon, and the fingers, in being dragged over the serrations, catch in the apertures in said barbs, and in passing over the length of the table will each accumulate a number of them. Across the front end of the vibrating table is a plate having in its front edge a series of notches, in which rest the upper ends of a series of vertical steel wires or "needles." These needles are concave or countersunk on their end faces, and are held by the notches in such position that the ends of the fingers, after passing over the table, drop into the cavities and draw the needles with them out of the notches, whereby the barbs accumulated on said fingers are allowed to fall or slide therefrom upon the needles with which said fingers are severally engaged. When the barbs are thus transferred to the needles, the fingers are lifted out of the cavities in the ends of the needles, which spring back into their respective notches ready to receive other barbs from succeeding fingers. This operation is repeated until the needles have all been suitably filled with barbs, after which they are removed from the notches and replaced by the free ends of other similar needles. For the purpose of shifting the needles, as stated, said needles are clamped by their fixed ends to a horizontal vibrating shaft or bar located at the front end of the machine, a series of needles projecting on each of two opposite sides of said bar. The shifting is effected by the rotation of this bar one half-turn, which brings the loaded needles to point downward and the empty ones to turn upward with their ends in the notches referred to, suitable means being provided for preventing the escape of the barbs from the loaded needles when the bar is rotated. The barbs are transferred from the needles to the fence-wires after the latter have been reversed, as described, in a manner hereinafter set forth.

In the operation of the machine described, the loose barbs, which are placed upon the rear portion of the serrated table, are dragged forward by the fingers and distributed over the whole length thereof. In this operation many of the barbs which are not caught upon the fingers are carried to the front end of the table and fall over the edge of the notched plate which holds the upper ends of the needles.

One object of this invention is to provide means for collecting the barbs as they fall from said plate and conveying them back to and delivering them upon the feed-table. In the machine shown the devices for this purpose consist of a rearwardly-inclined surface extending from the front end of the machine beneath the needles to a point beneath the rear end of the serrated table, and an elevator constructed to receive the loose barbs from the lower end of said inclined surface and to deliver them to the rear portion of the table.

The means previously used in the machine described for retaining the barbs upon the loaded needles when the bar supporting said needles is rotated consist of a number of curved guides arranged in a section of a cylinder concentric with and at the rear of and below the bar mentioned, said guides having vertical grooves between them, in which the ends of the loaded needles are directed in their descent, so that as the needles pass a horizontal position the barbs rest against said guides, and are retained thereby from escaping from the ends of said needles.

One objection to the device last described is that the curved guides are heavy and costly to construct, and another is that they occupy such a position upon the machine that most of the loose barbs which pass over and from the front edge of the serrated table fall upon them and remain thereon until removed by the operator.

The object of my invention as it relates to this device is to provide means for supporting the barbs upon the needles when they are reversed, whereby the curved guides described may be dispensed with.

To this end the invention consists in two movable bars constructed to revolve with the needles, and provided with devices for securing them in position, one upon each side of a series of loaded needles, near the ends of said needles, so that when said needles are reversed the barbs thereon will rest against said bars, and will thereby be prevented from escaping from the ends thereof. The said bars are each preferably provided upon one of their sides with a series of notches constructed to receive the ends of one series of needles, so as to retain the barbs upon such needles when they are reversed, and until transferred to the fence-wires, in the manner hereinafter more fully set forth.

In the accompanying drawings, Figure 1 is a side view of a machine embodying my invention. Fig. 2 is a front elevation of the same. Fig. 3 is a central longitudinal vertical section on line $x\ x$ of Fig. 2. Figs. 4, 5, 6, 7, 8, 9, 10, 11, and 12 are details which will be referred to in the following description.

A is the main frame of the machine, at the top of which, and between the longitudinal side pieces, A', is located a shaking tray or table, B, having a transversely ridged or serrated surface composed of a series of transverse overlapping metal strips, $b$, which form a series of inclined surfaces, $b'$, and vertical or nearly vertical faces $b^2\ b^2$. The said serrated table is supported upon two or more cross-strips, B', bolted to said table, and having their ends resting upon brackets $B^2$, attached to the side frame-pieces, A', and constructed to slide upon said brackets. A transverse vibratory motion is given to the table B by means of eccentrics C upon a shaft, C', through the medium of connecting-rods $c$, attached to the under side of the table.

The devices for supporting and vibrating the table B are shown in detail in Fig. 13 of the drawings, in which figure the eccentric-rod $c$ is shown as connected to the table at its side opposite to the eccentrics by means of a vertical standard, $c'$, and an inclined brace, $c^2$, both being bolted to the angle-irons $B^3$, which form the sides of the said table. The shaft C' is provided with a pulley, as shown, by which it may be driven by a belt from an independent counter-shaft.

Upon the front ends of the upper longitudinal side beams, A', which project beyond the table and overhang the main frame, are bolted standards $a$, supporting bearings $a'\ a'$ of shaft $d$, which carries sprocket-wheels D. Near the opposite ends of the side beams, A', are bolted corresponding standards, $a^2$, which support bearings $a^3$ for a shaft, $d'$, carrying sprocket-wheels D'. The sprocket-wheels D and D' are of equal size and operate an endless-belt structure or carrier, which, as a whole, is designated by the letter E. The carrier E consists of two chain belts, E', placed each on the opposite sprocket-wheels D D', and cross-bars or travelers $e$, secured to the belts E' at equal intervals. Additional sprocket-wheels $E^2$, as shown in Figs. 1 and 2, are placed between the wheels D and D', so as to support the carrier E and prevent it from sagging. The cross-bars or travelers $e$, which are upon the lower part of the carrier E when said carrier is moved in the operation of the machine, traverse the table B a short distance above and parallel to it, and to such cross-bars are attached vertically-movable fingers $f$, which accumulate the barbs when dragged across the serrations on the table, in the manner similar to that of the fingers in the machine upon which this invention is an improvement. The action of said fingers is as follows: The ends of the fingers rise upon each incline $b'$, and drop from one incline to the next at the vertical faces $b^2$. The loose barbs being distributed by the vibrating motion of the table along in the depressions and against said faces, the points of the fingers strike upon them, and in their forward movement catch into any of the apertures in the barbs which happen to lie in their path. Any barb so caught will be dragged along until the point of the finger, in falling over another ridge, encounters the aperture in another barb, which it will also catch, and the operation will be repeated until the end of the table is reached. As an improved construction of said bars $e$ and the fingers attached thereto, they are made as follows: The said bars are each composed of two parallel strips of metal, $e'$, which strips are rigidly connected at their ends, and are each provided with a series of oppositely-arranged apertures, in which short straight wires composing the fingers $f$ are placed. The bars $e$ are connected at their ends to the chain belts $E'$ by means of short arms $e^2$, rigidly attached to the said bars, and connected at their extremities to laterally and inwardly projecting lugs upon the links of said belts, as shown in Fig. 2, the said arms being arranged to project rearwardly from their point of attachment to the belts when the latter are passing near the surface of the table. The table B is provided with raised edges $b^3$, formed by the upturned edges of the angle-irons $B^3$, before mentioned, upon which edges the ends of the bars $e$ rest while moving over the said table. Said bars are thus supported uniformly above the serrated surface of the table, and at such a distance therefrom that the fingers $f$ may rise and fall freely in said bars as they are dragged across the serrations of such surface.

The parallel strips $e'$, composing the bars $e$, are arranged one above the other, so that the fingers $f$, which are placed, as before described, in apertures formed in said strips, will be in a vertical position during the time that the said bars $e$ are traversing the table. The fingers $f$ are constructed to slide freely in the apertures in the strips $e'$, and are provided with weights $f'$, placed upon their portions between the strips $e'$, by which the points of said fingers are kept in contact with the serrated surface of the table B as the bars $e$ traverse the said table. The weights $f'$, being placed between the strips $e'$, serve also as a stop to the play of the fingers in both directions, and to retain them in place when said fingers are not resting upon the surface of the table. The weights $f'$ are preferably composed of blocks of metal centrally apertured for the insertion of the wire composing the fingers, and are secured to said fingers by set-screws, whereby they may be adjusted longitudinally thereon for the purpose of controlling the position of the points of the fingers in reference to the bars $e'$ and to the surface of the table.

At the end of the table B is placed a transverse metal plate, G, which is supported in a substantially horizontal position and forms a continuation of said table. The plate G is provided in its front edge with a series of notches, $g$, which are arranged at the same distance apart as and in exact alignment with the fingers $f$, and its rear edge is placed close to the front edge of the table B, the terminal strip $b^4$ of the series of strips $b$, forming the surface of said table, being extended partially over the said plate, and covering the joint between the said table and the plate, so that the fingers $f$ will pass smoothly from the former to the latter. Below the plate G, and parallel to it, is located a shaft, H, journaled in bearings $H'$ upon the frame of the machine. The shaft H is square in its central portion, and two rows of steel needles, $h\,h'$, are clamped at their ends in transverse grooves formed upon two opposite sides of said shaft, and project in opposite directions therefrom. These needles are arranged at the same distance apart as the fingers $f$ and the notches $g$ in the plate G, and in exact alignment with them. The needles are about two feet in length, more or less, and have their upper ends countersunk or concaved, and said needles are adjusted upon the shaft H in such a manner that their concaved ends lie within the notches $g$ of the plate G, so that the ends of the fingers $f$, after traversing the said plate, will drop into and engage the ends of the needles and draw them forward out of the said notches. The engagement of the ends of the fingers with the needles is facilitated by providing transverse grooves $g'$ in the upper face of the plate G, and in the path of the fingers, as shown more plainly in Figs. 9, 10, 11, and 12, such grooves terminating in the notches $g$, and serving to guide the ends of the fingers into said notches. By the engagement of the barb-gathering fingers end to end with the needles, the barbs accumulated upon the fingers slip down upon the needles as soon as the latter are drawn away from the plate G, and the needles are thereby gradually filled with barbs. The devices, as far as described, for transferring the barbs from the fingers $f$ to the needles are substantially similar to those used in the machine previously referred to, and such devices form no part of this invention.

For the purpose of releasing the ends of the fingers from engagement with the needles after the barbs have been transferred from the former to the latter, means are provided for lifting the bars $e$, and thereby withdrawing the points of the fingers $f$ from the concavities of the needles. The devices shown for this purpose consist of two rollers, $E^3$, one of which is placed at each side of the machine a short distance forward of the plate G, and which are so arranged that the ends of the bars $e$ encounter them, and are thereby lifted sufficiently to allow the needles to escape from the fingers and return to their position in the notches $g$.

Means are shown in the accompanying drawings for giving an intermittently-retarded motion to the carrier-belt E, whereby the speed of the carrier may be reduced as the fingers approach the needles, and during their engagement with them, so that said fingers will more certainly engage the needles and transfer the barbs to the latter. Such devices, which form the intermediate connections between the pulley-shaft $d$ and a driving-shaft, K, mounted on the top of the machine and parallel to said shaft $d$, are fully described in the allowed application for a patent previously referred to, and are not a necessary feature of the present machine, as any suitable well-known devices may be used for producing a variable speed in the carrier E, as described.

For the purpose of guiding the bars $e$ as they pass from the end of the serrated tables B upon the plate G, so that the fingers $f$ in such bars will enter the guide-grooves $g'$ with certainty and remain in them while the said bars are passing over the plate G, a downwardly-projecting pin, $e^3$, is placed near one end of each of said bars, said pins being constructed to engage a groove, $g^3$, formed in a plate, $G^3$, attached to the plate G near its end, as shown in Figs. 9 and 11. The groove $g^3$ is parallel with the grooves $g'$, and the pin $e^3$ fits closely therein, so as to effectually prevent any lateral movement of the bars $e$, which might otherwise be caused by any irregularity in the motion of the chain belts. The groove $g^3$ is shown as being in a separate plate, $G^3$; but such groove may manifestly be formed in the plate G itself.

It has been found that the fingers $f$, (which are preferably made of steel,) in constantly dropping upon the bottom surface of the grooves $g'$ in passing from the overlapping strip $b^4$ of the serrated table, are liable to cut away or excavate the metal composing said plate at the points at which they strike, so that in time holes or depressions will be formed which are liable to catch and hold the ends of the needles, whereby they become broken or bent. To obviate this difficulty a hardened-steel plug, $g^4$, is placed in a circular aperture formed in the plate G at the point at which the fingers strike and in line with the grooves $g'$, as shown in Figs. 9, 10, and 11. The top surface of each of said plugs is preferably cut away for about half its diameter, so that one half of the upper surface thereof is level with the top surface of the plate G, and the other half is flush with the bottom surface of the grooves $g'$ therein. The ends of the fingers $f$, in passing from the edge of the plate $b^4$, strike first upon the upper part of the top face of the plug, and then drop to the lower part, from which they pass to and along the bottom surface of the grooves. By the construction described recesses $g^5$ are formed in the plate G over the cut-away portion of the plug, in which recesses the grooves $g'$ terminate, the intersecting walls of the recesses and grooves being rounded, as shown in the plan view, Fig. 11, so as to permit the ready passage of the ends of the said fingers $f$ from the said recesses to the grooves. The plugs $g^4$ are shown as being fitted closely in the apertures in the plate G, and in practice they are adjusted simply by driving them up from beneath; but any other well-known device for fastening and adjusting them may be used, as by screw-threading them. The notched upper face of said plugs shown is not essential to their effective use; but their ends may be flat and placed on a level either with the bottom of the grooves or the top surface of the plate. The said plugs are usually made of steel and tempered or hardened at their upper ends only.

It has been found, in the operation of the fingers $f$ in drawing the needles $h\ h'$ out of the notches $g$ and releasing them, that such needles, when so released, are liable to spring back into other notches than the ones in which they belong. This effect in some cases arises from the flexibility of the needles, the weight of the barbs thereon causing them to sway laterally; but it may arise from other irregularity in the action of the parts. In order to remedy this defect in the operation of the machine as heretofore constructed, I have placed upon the series of points, upon the edge of said plate and between the said notches, a corresponding series of forwardly-projecting fingers, $G^4$, preferably made of wire, and extending to a point slightly beyond the forward limit of the movements of the ends of the needles when they are drawn out of the notches. The end of each of the series of needles which is in engagement with the plate G is thus guided between two adjacent fingers $G^4$, and the return of such end to its appropriate notch is rendered certain. The shaft H is preferably located forward of a vertical plane passing through the notches in said plate G, and the needles, when their ends are in the said notches, as shown, will thereby have a backward inclination, so that the weight of the barbs thereon will tend to keep them in the notches. The said shaft is mounted in bearing-boxes H'—one at each side of the machine—as before stated, and is provided upon one end with a hand-wheel, $H^2$, by which it may be rotated, and also with a disk, I, secured rigidly upon the said shaft outside of and adjacent to the vertical end post, A, of the machine. Said disk is provided with two notches, $i$, placed at diametrically-opposite points in its periphery, which are arranged, in connection with a spring detent-lever, I', pivoted upon the side of the frame-post A, and having a lug, $i'$, constructed to engage the said notches, to hold the shaft H with either series of needles bearing with moderate force in the notches in the plate G.

When one of a series of needles, $h\ h'$, has been filled with barbs in the manner described, it is removed from the notches $g$ and the opposite and empty series of needles brought into place in said notches by rotating the shaft H by means of the hand-wheel $H^2$, the detent-lever I' being first relieved from engagement with the disk I. In this operation the shaft H is preferably rotated in a direction to carry the ends of the loaded needles backward and beneath the plate G; and in order to allow the needles, when so moved, to pass under said plate, it is pivoted at its ends and near its back edge to the side frame of the machine, and devices are provided for raising its front edge sufficiently to clear the ends of the needles as they pass beneath it. Said devices are preferably connected to and operate the detent-lever I', by which the shaft H is held from rotation, so that the said shaft may be released and the free edge of the plate G simultaneously raised for the purpose of releasing the ends of the needles.

As a preferable means for supporting and moving the notched or free edge of the plate G, a horizontal lever, I², is pivoted to the side of the upper horizontal frame-piece, as shown in Figs. 4, 9, and 11, one end, $i^2$, of said lever being placed beneath the front edge of the end G' of the plate G, and the other arm, $i^3$, being connected to a vertical rod, I⁴, which is preferably attached to and operated by a foot-lever, I³, pivoted upon the vertical end post, A', near the lower end thereof. Upon the frame-piece A', above the arm $i^3$ of the lever I², is a stop, I⁵, which serves to limit the upward movement of the said arm, and to thereby support the plate G normally in a horizontal position. The stop I⁵ preferably consists of a threaded bolt which passes through a bracket, $i^5$, upon the frame-piece A', and may thereby be moved vertically, so as to adjust the position of the front edge of the plate G as desired. Instead of supporting the front edge of the plate G in the manner shown, an adjustable stop may be attached to the machine-frame beneath the said plate, whereby the same result will be obtained.

For the purpose of operating the detent-lever I' simultaneously with the lifting of the plate G, the rod I⁴ is connected to and operates the said detent-lever, the connecting device, as shown, consisting of a vertical bar, $i^4$, pivoted at one end to the end of said lever I', and having its opposite and lower end bent horizontally, and secured to the said rod by being placed between a shoulder formed thereon and a collar secured to the said rod by a set-screw. The opposite end of the detent-lever I', Fig. 4, is connected to the upper end of a vertical rod, I⁶, which passes downward through a bracket, $i^6$, on the machine-frame, and has a nut, $i^7$, upon its lower end, between which nut and the bracket $i^6$ is placed a coiled spring, I⁷. The said spring tends by its expansion to draw the rod I⁶ and the end of the lever I', to which said rod is attached, downward, and to thereby raise the opposite end of the said lever, so as to force the lug $i'$ thereon into the notches $i$ in the disk I, and at the same time to retain the rod I⁴ at the upper limit of its movement.

As an improved means for supporting the barbs upon the filled needles during the time that the shaft is being rotated for the purpose of removing said filled needles from the notches in the plate G, and while the barbs are being transferred from said filled needles to the fence-wires, devices are provided as follows: Upon both ends of the shaft H, inside of the bearing H', are pivoted two pairs of arms, J J', which are somewhat shorter than the needles $h h'$, and are rigidly connected in pairs by cross-bars J² and J³, said cross-bars being equally distant from the shaft H and parallel thereto. The bars J² and J³ are each provided upon their edges which are toward the rear end of the machine when the said bars are above the shaft H with a series of projecting points having triangular notches $j$ between them. The said notches are arranged at equal intervals and at the same distance apart as the needles $h$, so that when one of the bars J² or J³ is revolved upon the shaft H, so as to bring it into contact with one of the series of needles, each of the needles of said series will rest in one of said notches. The arms J and J' at one end of the shaft H are rigidly attached to the hubs of separate hand-wheels J⁴ and J⁵, by which each pair of said arms and the cross-bars J² and J³ may be independently revolved. The bars J² J³ are severally placed upon opposite sides of the double series of needles upon the shaft H, so that each of said bars can be revolved through a half-circle only, (or in an arc limited at each end by the two opposite series of needles,) and so that either of their edges may be brought in contact with said needles, as hereinafter set forth.

Upon the shaft H is a disk, K, which is rigidly secured thereto between two of the arms J and J' at one end of the shaft. The said arms are preferably close to or in contact with the faces of the said disk, and are provided with spring-detents $j^3$, constructed to engage a double set of notches, $k$, $k'$, and $k^2$, Fig. 12, formed in the periphery of the disk on opposite sides thereof, whereby the arms J and J' and bars J² and J³, supported thereby, may be secured to the shaft in several positions in relation to the needles, as hereinafter described.
The notch $k$ upon the disk K is for the purpose of supporting one of the bars J² or J³ at the time the corresponding series of needles $h$ or $h'$ is located in the notches $g$ in the plate G, and are being filled. For this purpose the said notch $k$ is preferably so placed that the bar will be held, as shown at J², Fig. 3, in a position above the shaft H, and at a distance forward of the plate G sufficient to allow the necessary amount of movement in said needles when they are drawn away from the said plate by the fingers $f$ while they are being filled, as before described. The bar at the time it is held in the position described performs no function in the operation of the machine, but is supported in such position so that it will not interfere with the delivery of barbs to the needles, and will at the same time be out of the way of the operator who is removing barbs from the series of needles which are pointing downward. The notch $k'$ is for the purpose of holding the bar, as J², whose notched edge is opposed to one of the series of needles, as $h$, in contact with such series, so that the several needles of the series will engage the notches $j$, and when the needles are reversed, together with the bar in contact therewith, the barbs will be retained upon the needles by resting upon the said bar until they are removed therefrom. The notch $k^2$ is for the purpose of holding one bar, as $J^3$, Fig. 12, in position with its rear or unnotched edge in contact with the series of loaded needles at the time that the notched edge of the other bar, as $J^2$, is engaged with the same series, so that the ends of the needles will be confined in the notches $j$ while the shaft H is being rotated. The purpose of so confining the ends of the needles is to prevent them, when they are released from the plate G and thrown backward, from bending away from the notches in the bar, as $J^2$, with which they are engaged, so as to effect the release of the bars held upon them by such bar, such bending resulting from their necessary flexibility and the weight of the barbs with which they are loaded. The notches $j$ are preferably formed by a series of projecting triangular plates, $j'$, secured by screws $j^2$ or other means to the inner faces of the bars $J^2$ and $J^3$, near the edges thereof, as shown in Figs. 10 and 12. By this construction, when the bars $J^2$ and $J^3$ are brought together, as shown in Fig. 12, the plates $j'$ upon one of the said bars overlap the other bar by passing beneath the inner face thereof, and thus allow the bars to approach each other sufficiently to confine the ends of the needles closely in the notches $j$.

The operation of reversing the needles or removing a series, as $h$, of filled needles from the notches $g$ is as follows: One of the bars, as $J^2$, being in position above the shaft H and clear of the needles, as before described, the other bar, as $J^3$, whose notched edge is arranged to engage the opposite series of needles $h'$, is first rotated backward in reference to the direction of motion of the needles, so as to bring its straight or back edge in contact with or near the needles $h$, and is held in such position by the engagement of the detent $j^3$ upon the arm $J'$ with the notch $k^2$. The bar $J^2$ is then revolved upon the shaft H by means of the hand-wheel $J^4$ until the said bar encounters the needles and the latter have severally entered notches $j$ upon the edge of said bar, and are confined in said notches by the bar $J^3$, as shown in Fig. 12, and the arm $J^2$ is secured to the disk K by the engagement of the detent $j^3$ with the notch $k'$ therein. The plate G is then lifted at its front edge, and the shaft H is rotated by means of the hand-wheel $H^2$, the series of loaded needles, together with the bars $J^2$ and $J^3$, which are in engagement therewith, being revolved, so as to pass beneath said plate and backward and downward until brought into a position inclining forward from a vertical line, as indicated by the series $h'$ in Fig. 3, and in position for emptying. When the series of needles $h$, with the bars $J^2$ and $J^3$ in engagement therewith, is brought into position for emptying, as described, the bar $J^3$ is in position forward of and with its rear edge resting against the needles. In order to remove it from such position, so that it may be out of the way of the operator in emptying the filled needles, the said bar is revolved until it reaches a point nearly above the shaft H, and is secured by the engagement of its detent $j^3$ with the notch $k$ in the position as first described in connection with the bar $J^2$.

The operation of both of the bars $J^2$ and $J^3$ in reference to each of the series of needles $h$ and $h'$ is manifestly the same. When the series of filled needles are brought downward, and are in position for emptying, as before described, the barbs are removed from them by first placing the end of a fence-wire previously sharpened for the purpose in the concave end of a needle, or end to end therewith, and then drawing the needle forward out of the notch $j$, so as to allow the barbs to slide off the needle and upon the fence-wire. The same operation is repeated until all the needles of the series have been emptied.

For the purpose of counterbalancing the weight of the bars $J^2$ and $J^3$ and the arms by which they are supported, the arms $J$ $J'$, at the end of the shaft H opposite to the several devices for actuating the bars described, are extended beyond their pivotal points on the said shaft and provided with counterbalance-weights $J^6$ and $J^7$. By the use of such weights the power required for moving the bars $J^2$ and $J^3$ in the operation of the machine does not greatly exceed that necessary to overcome the friction of the parts.

The detents $j^3$, by means of which the bars $J$ and $J'$ are held in the several positions described by engagement with the notches $k$, $k'$, and $k^2$ in the disk K, consist of bars of metal, which are attached to and constructed to slide longitudinally upon the sides of the arms $J$ and $J'$, which are adjacent to the said disk. These detents are each provided with a coiled spring, $J^8$, placed between the outer end thereof and the inner faces of the ends of the bars $J^2$ or $J^3$, which spring tends to keep the end of the detent in the notches mentioned. For the purpose of moving the said detents so as to release them from engagement with the notches in the disk, each is provided with a stud, $j^4$, which projects through a slot in the arm $J$ or $J'$, upon which it is placed, and also through one end of a plate, $j^5$, said plate being pivoted to said stud, so as to swing laterally thereon. The plate $j^5$ is provided at its opposite end with a handle, by which it may be moved, and in its central portion with an inclined or cam slot, $j^6$, through which passes the shank of a stud, $j^7$, secured on the arm mentioned. When the plate $j^5$ is swung laterally on the stud $j^4$, said plate will be moved longitudinally of the arm by the action of the stud $j^7$ in the slot $j^6$, and, through the medium of the said stud $j^4$, will throw the detent $j^3$ out of the notch with which it is engaged. The cam-slot $j^6$ is made of sufficient width to allow considerable longitudinal play to the stud $j^7$, so that the detent $j^3$ is free to move outwardly by the yielding of the spring $j^5$, the said cam-slot being constructed to act upon the stud $j^7$ at one of its sides only, as shown in Fig. 6.

The notches $k$ in the disk K, with which the detents $j^3$ are engaged for the purpose of holding the bars $J^2$ and $J^3$ in position while the needles are being filled, are preferably provided with an inclined wall, $k^3$, as shown in Fig. 12, which is arranged to permit the said detent to rise out of the said notch by the yielding of the spring $J^8$ and pass into and engage the notch $k'$ automatically when one of the bars $J^2$ or $J^3$ is thrown forward against the needles preparatory to reversing them. In the practical operation of this machine it is found unnecessary, as a separate operation, to thus throw the bar which is in position above the shaft H forward against the needles; but the bar which is below the shaft H having been turned backward and upward until its detent engages the notch $k^2$, so that the said series of loaded needles will be supported upon its back or straight edge in the manner before described, the shaft H may then be rotated, and in such rotation, as soon as the bar first mentioned, which is held by the detent $j^3$ in the notch $k$, passes over the center of the shaft H, it will fall backward by gravity (the detent $j^3$ passing out of the notch $k$ over the incline $k^3$) until it encounters the needles mentioned, and the said detent will then engage the notch $k'$ and retain the said bar in contact with the needles.

In the operation of the machine the barbs, as already stated, are delivered upon the rear end of the table B, and are distributed thereon by its lateral vibration and by the action of the fingers $f$, which drag them forward. In the constant passage of the fingers over the table many barbs that are not caught by said fingers are thus carried over the edge of the plate G and fall to the floor; and in order to prevent such loose barbs from falling upon the operator while engaged in removing the barbs from the loaded needles, two oppositely-projecting and curved plates, $H^4$, are secured to the shaft H, as shown more clearly in Fig. 2, said plates forming an inclined shield to deflect the barbs inwardly beneath the machine, as shown and described in the application previously mentioned.

In the operation of the machine upon which this invention is an improvement the loose barbs falling from the end of the table B were gathered up by the operator and returned to the feed end of the table B. In order to render this labor unnecessary, devices are provided for collecting such loose barbs as they fall from the shield mentioned and delivering them automatically to the rear portion of said table. For this purpose an inclined trough or chute, L, is placed in the frame of the machine, beneath the table B, the upper or elevated end of which chute is supported by an end frame-piece, $A^2$, and terminates nearly beneath the shaft H, and in a position to receive the loose barbs deflected inwardly by the shield-plates $H^4$. The said upper end of the chute L extends the full width of the machine-frame, so as to more effectually arrest all of the loose barbs which may fall from the plate G, and its lower end terminates at a point beneath the rear end of the table B, and is preferably supported by inclined standards M from the floor. Across the lower end of said chute is placed a transverse inclined plate, M', for preventing the escape of barbs which descend over the inclined bottom surface of the chute. For the purpose of raising the loose barbs from the lower end of the chute L and delivering them upon the rear portion of the table B, an elevator is provided, preferably consisting of two chain belts, N, having buckets O, extending the full width of the table, and constructed to receive the barbs from said elevator in a manner hereinafter described.

The lower end of the chute L is made of approximately the same width as the elevator-buckets, and this width being less than that of the upper end of the chute, the sides of said chute converge from the upper to the lower end thereof, and are provided with inwardly-inclined plates L' upon either side, for deflecting any loose barbs which may accidentally escape or fall from the operative parts of the machine above it inwardly and upon the surface of said chute. Inclined depending shields or deflecting-plates $L^2$ may also be placed upon the inner sides of the top longitudinal frame-pieces, A', as shown in Figs. 1 and 13, for the same purpose.

The chain belts N of the elevator are placed upon two sprocket-wheels, N', mounted upon shafts $N^2$, having bearings at $n^2$ upon the vertical end posts, A, of the machine, one of said shafts being placed at a point near the lower ends of said posts, and the other vertically above it at the top thereof. The chain belts N are provided with a series of oppositely-arranged and outwardly-projecting lugs or arms, $n$, upon the ends of which and between the said belts the elevator-buckets O are supported. The said buckets are preferably made in the shape of long and narrow troughs, their length being approximately equal to the width of the table B, as before stated, and V-shaped in cross-section, as shown, so as to permit the ready discharge of their contents. The said buckets are pivoted to the arms $n$ at a point above their centers of gravity, so that they hang constantly in the same position during the movement of the chain belts. The said belts, during the operation of the machine, are driven by the rotation of the shafts $N^2$ in such direction that the buckets adjacent to the chute L and the table B have an upward movement, the lower ends of the said chain belts and the buckets thereon being so arranged in relation to the lower end of the chute L that at the beginning of the said upward movement of the said buckets their outer edges come into a position in the same vertical line with and beneath the upper edge of the inclined plate M'. The ends O' of the buckets O are extended downwardly at their sides, so as to form parallel and vertical guides $o$, which rest against the vertical edges $m^5$ of plates $m'$ at either end of the plate M', and prevent any tilting motion in said buckets while they are in position beneath the upper edge of the said plate M', as described.

In order to discharge the loose barbs accumulated at the lower end of the inclined chute L and against the said plate M' over the upper edge of said plate and into the buckets O, devices are provided as follows: A narrow opening is formed in the bottom of the chute L, extending the full width thereof, and adjacent to the inclined plate M', and in said opening is placed a sliding plate, $M^2$, located between and in contact with the said inclined plate and a cross-bar, $m$. The said cross-bar $m$ is attached at either end to the plates $m'$, which are bolted to the top of the standards M, as shown in Fig. 1, and supports the lower edge of the sheet-metal bottom of the chute L, as shown. The plate $M^2$ is so located that in its normal position its top surface forms a portion of the bottom of the chute, as shown in Figs. 3 and 7, and such plate is constructed to slide upward, so that the said top surface may be brought to or near the upper edge of the plate M'. This sliding movement or reciprocation of the plate $M^2$ is accomplished by automatic devices operated by pins $n'$ upon the elevator-belts N, so that as each elevator-bucket comes into position below the upper edge of the inclined plate M', as described, said plate $M^2$ will be pushed up along the face of the plate M', carrying with it the barbs resting against such plate, which barbs will thus fall over the upper edge of such plate and into the bucket beneath. Upon each end of the plate $M^2$ are downwardly-projecting arms $M^3$, which rest upon the face of the inclined standards M, and are provided upon their lower ends with lateral projections $m^3$, which are provided with grooves constructed to slide upon guide-flanges $m^2$ upon the inner sides of the said standards, Figs. 3 and 7, the object of such guide-flanges being to keep the arms $M^3$ in perfect alignment with the bearing-faces of the plate M' and the cross-bar $m$ during the reciprocations of the plate $M^2$. The sliding plate $M^2$ is lifted by the contact of the pins $n'$ upon the chain belts N with levers P, the latter being pivoted at one end to brackets P', attached to the vertical frame-posts A, as shown in detail in Fig. 8, and connected at their opposite extremities, by means of connecting-rods $p$, to the outer ends of bars $M^4$, bolted to the lower ends of the arms $M^3$, as shown in Figs. 2 and 7. The levers P are provided with inwardly-projecting portions $p'$, against which the pins $n'$ strike as the said pins are moved upward, after passing around the lower sprocket-wheels, N', the said levers being arranged so that their free ends will be raised and the plate $M^2$ pushed upward at the moment that a bucket is in position to receive the barbs discharged over the upper edge of the plate M' by such movement of the plates $M^2$. The projections $p'$ are so placed that the pins $n'$ will pass from the ends thereof at the moment the plate $M^2$ reaches the top of the plate M' and allow the said plate to fall by gravity to its normal position. A block, $M^4$, is bolted to the foot of the standards M, which block serves as a stop to the downward movement of the plate $M^2$, so as to prevent the descent of its upper surface below the bottom of the chute L.

The pins $n'$ upon the chain belts N are preferably formed by an extension of the pivot-pins, by which the buckets O are hung upon the ends of the arms $n$ upon the said belts, and said pins may be provided with rollers to prevent friction during their contact with the levers P. The brackets P', to which the said levers P are pivoted, are preferably bolted to the outside faces of the vertical posts A, and have their ends bent inwardly, as shown in Fig. 8, in position for the attachment of said levers.

The use of the devices described for delivering the barbs from the lower end of the chute L to the elevator-buckets is rendered necessary from the peculiar nature of the barbs mentioned. It is found that such barbs, when in bulk, will not flow or shift upon each other as small and round bodies do, but remain in a compact mass, which cannot be readily separated or penetrated. For this reason the use of a receptacle for the barbs at the bottom of the elevator, from which they may be taken by the passage of the elevator-buckets through such receptacle, in the customary manner, is found to be impracticable. In the operation of the devices as shown the barbs resting against the plate M' and upon the top of the sliding plate $M^2$ are lifted from beneath, so that they are readily parted or separated from the remainder of the barbs in the chute, and when raised to the edge of the said plate M', being unsupported by said plate, they slide from the inclined upper surface of the said plate $M^2$ and over the edge of the plate M' into the elevator-buckets.

At the top of the machine, and partially overhanging the rear edge of the table B, is placed a tilting receptacle, Q, Figs. 1 and 3, which is pivoted at either end to vertical standards $q\ q$, attached to the upper longitudinal frame-piece, A'. Beneath the rear portion of the said receptacle is a cross-bar, Q', which is supported upon the frame of the machine, and upon which the said rear portion rests, said rear portion being made of preponderating weight, whereby the said receptacle is retained, normally, in a horizontal position. The barbs are discharged from the buckets O into the receptacle Q by the operation of a stationary bar, R, the end of which encounters the outer edge of the said buckets after they have reached a position above the receptacle Q', and swings said buckets upon their pivots sufficiently to discharge their contents. The rear portion of the said receptacle projects over and into the path of the buckets O, and after the discharge of the contents of one bucket into the receptacle in the manner above described such rear portion is lifted by the contact of the next succeeding bucket of the series with the under surface thereof, and the barbs are allowed to fall from the open side of the receptacle upon the table B. In the operation of tilting the receptacle Q the upper curved portions of the end plates O' come in contact with the bottom surface of the receptacle, as illustrated in Fig. 3, and any tipping of the buckets at such time is prevented by a guide-piece, $q'$, (shown in Fig. 3,) attached to the end posts, A, in position to bear against the vertical sides of the end plates O' of the buckets at the time they are lifting the receptacle.

It is found desirable, in order to produce the most rapid and effectual action of the fingers $f$ in accumulating barbs, to place a considerable number of loose barbs upon the serrated table B, so that the surface of the table is often in practice substantially covered with said barbs. The forward movement of the fingers, especially such as have barbs upon them, under these circumstances results in dragging a considerable number of the loose barbs over the front edge of the said table.

By the use of the automatic devices that have been described for replacing the loose barbs upon the rear portion of the table, no inconvenience or additional labor is occasioned by the passage of the loose barbs from the front edge of the table, and barbs may be fed thereto in any quantities found desirable or necessary in order to obtain the best results in the operation of the machine.

I claim as my invention—

1. In a machine for stringing barbs, the combination, with a table for supporting the loose barbs to be strung, traveling fingers for accumulating barbs from said table, and a series of wires or needles constructed to receive the barbs accumulated by said fingers, of means for transferring to the rear or feed end of the table the loose barbs carried to the front end thereof by the forward movement of the fingers, substantially as described.

2. In a machine for stringing barbs, the combination, with a table for supporting the loose barbs, traveling fingers for accumulating barbs from said table, and a series of wires or needles for receiving barbs from said fingers, of a rearwardly and downwardly inclined chute for receiving the loose barbs falling from the front end of said table, and an elevator constructed to raise said loose barbs from the lower end of said chute and deliver them to the rear end of the table, substantially as described.

3. In a machine for stringing barbs, the combination of the serrated table, the traveling fingers, the receiving-needles, inclined shields $H^4$, and chute L, substantially as described, and for the purpose set forth.

4. The combination, with the serrated table B, traveling fingers $f$, chute L, and vertically-movable elevator-buckets, of means for discharging barbs from the lower end of said chute into the said elevator-buckets, substantially as described.

5. The combination, with the chute L, provided with an inclined plate, M', at its lower end, and with an elevator provided with buckets O, constructed and arranged to move upward with their sides adjacent to said plate, of a sliding plate, $M^2$, and means for reciprocating said plate in harmony with the movement of the elevator, substantially as described.

6. The combination, with the chute L and the reciprocating plate $M^2$, for discharging barbs from the lower end of said chute, of levers P, pivoted to the machine-frame and connected to the said sliding plate $M^2$, and elevator-belts N, provided with pins $n'$, constructed to encounter said levers for the purpose of lifting said plate, substantially as described.

7. The combination, with the chute L, with the belts N, provided with pins $n'$, and with the reciprocating plate $M^2$, for discharging barbs from the said chute, of pivoted levers P, connected with the said plate $M^2$, and provided with projections $p'$, for engagement with the pins $n'$, substantially as described.

8. The combination, with the chute L, with the levers P, and with means for operating said levers, of the sliding plate $M^2$, provided with projections $m^4$, and links or rods $p$, pivoted to the end of said projections and to the levers P, substantially as described.

9. In the machine described, the combination of the chute L, stationary plate M', guiding-standard M, sliding plate $M^2$, provided with arms $M^3$, constructed to engage the guide-standards, and means for operating the plate, substantially as described.

10. The combination, with the chute L and sliding plate $M^2$, of the standards M, the inclined plate M', the end plates $m'$, and cross-bar $m$, substantially as described.

11. The combination, with the chute L, standards M, and reciprocating plate $M^2$, of the stops $M^4$ upon said standards, for limiting the downward movement of the said plate $M^2$, substantially as described.

12. The combination of the chute L, provided with the stationary inclined plate M', for delivering loose barbs from the lower end of said chute over the said plate, end plates $m'$, provided with vertical guiding-edges $m^5$, elevator-belts, and pivoted elevator-buckets O, provided with guide-flanges $o$, substantially as and for the purposes set forth.

13. The combination, with the chute L, elevator-belts N, buckets O, devices for discharging the barbs from the lower end of said chute to the said buckets, and levers P, for operating such discharging devices, of pivot-pins $n'$, attached to the buckets O, and constructed to engage the said lever, substantially as described.

14. In a barb-stringing machine, the combination, with the table B, chute L, elevator-belts N, and buckets O, pivoted to said belts, of a tilting receptacle, Q, and means for discharging the buckets upon said receptacle, substantially as and for the purpose set forth.

15. In a barb-stringing machine, the combination, with the table B, chute L, elevator-belts, and pivoted buckets, of a tilting receptacle in position to be tilted by the buckets, and a trip-bar constructed to rotate the buckets, substantially as described.

16. The combination of elevator-belts N, pivoted buckets O, provided with guide-flanges $o$, a receptacle, Q, and a guide-stop, $q'$, attached to the machine-frame, substantially as and for the purpose set forth.

17. In a barb-stringing machine, the combination, with a serrated table for the barbs, the traveling barb-gathering fingers, and a rotatable shaft provided with one or more series of needles for receiving the barbs from said fingers, of a movable notched plate for supporting the ends of the needles in position to be engaged by the said fingers, and means for moving said plate so as to allow the ends of the needles to pass beneath it when the said shaft is rotated, substantially as described.

18. In a barb-stringing machine, the combination, with a table for supporting the barbs, barb-gathering fingers, and a rotatable shaft provided with one or more series of needles, of a notched plate, G, pivoted at its rear edge to the machine-frame, and means for vertically moving the free edge of said plate, substantially as and for the purpose set forth.

19. In a barb-stringing machine, the combination, with a table for supporting the barbs, traveling barb-gathering fingers, a rotatable needle-shaft provided with one or more series of receiving-needles, means for securing said shaft in a desired position, and with a pivoted plate provided with notches on its free edge for supporting the ends of the said needles, of means for raising the free edge of said plate and simultaneously releasing said shaft, substantially as and for the purpose set forth.

20. The combination, with the barb-supporting table, of the pivoted plate G, lever $I^2$, rod $I^4$, and foot-lever $I^3$, substantially as and for the purpose set forth.

21. The combination, with the pivoted plate G, of the shaft H, the notched disk I on said shaft, a rod, $I^4$, and lever $I^2$, for moving the said plate G, and a spring detent-lever, $I'$, constructed to engage said disk and connected to said rod $I^4$, substantially as described.

22. In the machine substantially as described, the combination, with the plate G, pivoted lever $I^2$, and means for operating said lever, of a vertically-adjustable stop, $I^5$, substantially as and for the purpose set forth.

23. In a barb-stringing machine, substantially as described, the combination, with a rotatable needle-shaft provided with one or more series of receiving-needles, of one or more bars pivotally supported concentrically with said shaft, and means for securing said bars in contact with the said needles, so as to prevent the escape of barbs from the ends of the latter, substantially as described.

24. In a machine for stringing barbs, the combination, with the shaft H and oppositely-projecting series of needles $h$ $h'$ thereon, of bars $J^2$ and $J^3$, provided upon one of their edges with notches for engagement with said needles, arms J and J', connected to the ends of said bars and pivoted upon said shaft, hand-wheels $J^4$ and $J^5$, for rotating said arms, and means for securing said arms from rotation on said shaft, substantially as and for the purpose set forth.

25. The combination, with the shaft H and with the oppositely-projecting series of needles $h$ $h'$ thereon, of the bar-supporting arms J and J', pivoted to said shaft, detents $j^3$ upon said arms, and a disk, K, fixed to said shaft and provided with notches $k$, $k'$, and $k^2$ upon its periphery, substantially as described.

26. In a barb-stringing machine, the combination, with the shaft H, a bar-supporting arm (as J) pivoted to said shaft, and a notched disk, K, thereon, of a sliding detent, $j^3$, attached to said arm, for engagement with the notches of the disk, a spring, $J^8$, for retaining said detent in engagement with the notches, and means for releasing said detent from engagement with said notches, constructed to hold it in its retreated position, substantially as described.

27. In a barb-stringing machine, the combination, with the shaft H, a bar-supporting arm (as J) constructed to rotate on said shaft, provided with a stud, $j^7$, a notched disk, K, secured to said shaft, a detent, $j^3$, and a spring, $J^8$, of a slotted cam-plate, $j^5$, pivoted to the said detent and constructed to engage the stud $j^7$, substantially as and for the purpose set forth.

28. In a barb-stringing machine, the combination, with the shaft H, provided with two series of needles, of revolving bars $J^2$ and $J^3$, pivotally supported concentrically with and at equal distances from said shaft, a notched plate or series of plates, $j'$, attached to one edge of each bar, constructed in such manner that the plate or plates on one bar will lap the adjacent edge of the other bar when said bars are brought together, and thereby confine the needles in the notches, substantially as set forth.

29. In a barb-stringing machine, the combination, with the rotating needle-supporting shaft H, and with a bar, as $J^2$, pivotally supported concentrically with said shaft, of a counterbalance-weight, as $J^6$, substantially as and for the purpose set forth.

30. In a barb-stringing machine, the combination, with the serrated table and raised side pieces or guides, $b^3$, of a series of vertically-yielding finger-carrying bars, $e$, constructed to rest at their ends upon said guides, substantially as described.

31. In a barb-stringing machine, the combination, with the receiving-needles, and with vertically-yielding traveling bars $e$, provided with fingers $f$, of a roller, $E^3$, upon the machine-frame, constructed to raise said bars, so as to release said fingers from engagement with the needles, substantially as set forth.

32. In a barb-stringing machine, the combination, with the serrated table for supporting the barbs, with the traveling bars provided with barb-gathering fingers, with needles for receiving the barbs from said fingers, and with the notched plates G, provided with transverse grooves upon its upper surface, of means for guiding said bars, constructed to direct the fingers into said grooves and retain them therein during the passage of said bar over the said plate, substantially as described.

33. In a barb-stringing machine, the combination, with the traveling bars $e$, provided with fingers $f$, and the notched plate G, provided with grooves $g'$ in its upper surface, of a grooved guide-plate, $G^3$, attached to said plate G, and a pin, $e^3$, secured to the bar $e$, and constructed to engage the said grooved plate, substantially as and for the purpose set forth.

34. In a barb-stringing machine, the combination, with the serrated table and the carrier-belts E', of the finger-carrying bars $e$, provided with forwardly-projecting arms $e^2$, for attachment to said belts, substantially as and for the purpose set forth.

35. The combination, with the serrated table B and with traveling bars $e$, of fingers $f$, constructed to slide vertically in said bars, and provided with weights $f'$, substantially as described.

36. The combination, with the serrated table B, and with the vertically-movable barb-gathering fingers $f$, of traveling bars $e$, composed of two parallel strips, $e'$, provided with oppositely-arranged apertures for the insertion of the said fingers, and weights $f'$, placed upon the portion of said fingers between the said strips, substantially as described.

37. In a barb-stringing machine, the combination, with the table for supporting the barbs, with traveling barb-gathering fingers, and with the receiving-needles, of a notched plate for supporting the ends of said needles, provided with guide-fingers $G^4$, substantially as and for the purpose set forth.

38. In a barb-stringing machine, the combination, with a table for supporting the barbs, with traveling barb-gathering fingers, with receiving-needles, and with a notched plate, G, for supporting the ends of said needles, of adjustable plugs $g^4$, substantially as and for the purpose set forth.

39. In a barb-stringing machine, the combination, with the traveling barb-gathering fingers, of the notched plate G, for the support of the receiving-needles, said plate being provided with grooves leading to the notches, and terminating at their ends remote from the notches in recesses $g^5$, substantially as described.

40. In a barb-stringing machine, the combination, with a table for supporting the barbs, traveling barb-gathering fingers, and a chute, L, placed beneath said table, of inclined shields $L^2$, for deflecting loose barbs that may escape from the said table inwardly upon said chute, substantially as described.

In testimony that I claim the foregoing as my invention I affix my signature in presence of two witnesses.

ORLANDO P. BRIGGS.

Witnesses:
M. E. DAYTON,
PETER J. ELLERT.